United States Patent
Bao et al.

(10) Patent No.: US 6,792,049 B1
(45) Date of Patent: Sep. 14, 2004

(54) DIGITAL TRANSCEIVER SYSTEM WITH ADAPTIVE CHANNEL PRE-CODING IN AN ASYMMETRICAL COMMUNICATIONS NETWORK

(75) Inventors: Jay Bao, Bridgewater, NJ (US); Daqing Gu, Port Jefferson, NJ (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 744 days.

(21) Appl. No.: 09/595,252

(22) Filed: Jun. 15, 2000

(51) Int. Cl.[7] .......................... H04B 15/00; H04L 25/49
(52) U.S. Cl. .................. 375/285; 375/296; 375/232; 375/219
(58) Field of Search .................... 375/219, 229, 375/230, 231, 232, 233, 285, 295, 296, 316, 346; 455/39, 63.1, 73; 370/497, 522

(56) References Cited

U.S. PATENT DOCUMENTS

| | | | |
|---|---|---|---|
| 4,860,317 A | | 8/1989 | Tomlinson .................. 375/285 |
| 5,809,033 A | * | 9/1998 | Turner et al. ............... 370/522 |
| 5,881,363 A | * | 3/1999 | Ghosh et al. ............... 725/125 |
| 5,999,542 A | * | 12/1999 | Turner et al. ............... 370/497 |
| 6,243,425 B1 | * | 6/2001 | Langberg et al. ........... 375/285 |
| 6,314,135 B1 | * | 11/2001 | Schneider et al. .......... 375/232 |
| 6,324,220 B1 | * | 11/2001 | Sellars ....................... 375/296 |
| 6,327,302 B1 | * | 12/2001 | Shen .......................... 375/232 |
| 6,640,248 B1 | * | 10/2003 | Jorgensen ................... 709/226 |
| 6,678,320 B1 | * | 1/2004 | Aydin ........................ 375/235 |
| 6,693,958 B1 | * | 2/2004 | Wang et al. ................ 375/232 |

* cited by examiner

Primary Examiner—Chieh M. Fan
(74) Attorney, Agent, or Firm—Dirk Brinkman; Andrew J. Curtin

(57) ABSTRACT

A digital transceiver system includes a downlink channel and an uplink channel. In the system, a transmitter transmits signals on the downlink channel and receives signals on the uplink channel. The transmitter includes a pre-coder having a plurality of filters. Each filter has a corresponding filter coefficient. The transmitter also includes a filter coefficient updater coupled to the pre-coder. A receiver of the system receives signals on the downlink channel and transmits signals on the uplink channel. The receiver includes linear equalizers having a plurality of taps. Each tap has a corresponding tap coefficient. The coefficient updater is configured to dynamically update the filter coefficients according to the tap coefficients which are indicative of the frequency response of the receiver.

10 Claims, 6 Drawing Sheets

DIGITAL TRANSCEIVER SYSTEM WITH ADAPTIVE CHANNEL PRE-CODING IN AN ASYMMETRICAL COMMUNICATIONS NETWORK

FIELD OF THE INVENTION

This invention relates generally to digital transceivers, and more particularly to transceiving adaptively pre-coded digital signals in an asymmetric communications network.

BACKGROUND OF THE INVENTION

Recently, broadband fixed wireless access technology has been widely regarded as an effective way to realize point-to-multipoint high data rate transmissions, as evidenced by standardization activities in ETSI BRAN and IEEE802.16, see RES 10/96 ETR7- 10C Report, "*The ETSI HIPERLAN Layer Architecture*," October 1996, and the IEEE802.16 Fixed Wireless Access Standard Committee draft for IEEE802.16 FWA, under development.

Broadband wireless systems for multimedia applications must combat fading, multipath impairments, and inter-symbol interference (ISI) that can degrade the received signal. The very high data rates, e.g., 20 Mb/s or higher, at a low bit error rate for multimedia data, together with high carrier frequencies, ranging from time-dispersive Microwave Multipoint Distribution System (MMDS) bands (<10 GHz) to fading dominated millimeter-wave bands (e.g. 10–66 GHz), make these issues particularly difficult to solve.

A number of approaches have been proposed in recent years, see Matsumoto et al. "*Configuration and performance of transmission-diversity-combined OFDM systems for broadband wireless access*," Globecom2000, and Kang et al. "*Modulo-Type Viterbi Decoder for High-Speed Digital Transmission Systems*," IEEE Comm. Let., Vol. 4, No. 2, February 2000.

These prior art approaches include single carrier M-ary quadrature amplitude modulation (M-QAM) systems and multicarrier systems based on Orthogonal Frequency Division Multiplexing (OFDM). They differ in performance as well as implementation complexities.

Of particular importance is a fixed wireless access system. For the purpose of this description, a base station ("cell tower") of the wireless system will be referred to as the "transmitter," and the client radio, e.g., cellular telephone, as the "receiver." It should be understood that both the base station and client can transmit and receive signals.

One characteristic of such a fixed wireless system is its asymmetric nature. The system has a large downlink from the base station (transmitter) to many clients (receivers). The system has a smaller uplink from each individual client "receiver" to the base station "transmitter." The relatively high installation cost of installing and operating a small number of base stations, compared to a multitude of relatively low-cost client radios, lead one to pursue system designs that minimize the complexity, power consumption and cost for the clients, by adding more processing to base stations.

One prior art solution to reduce signal degradation uses large decision feedback equalizers in the receiver. However, this solution increases the computational complexity and cost of the receiver. The situation worsens as multipath distortion increases. Often, long training sequences must be sent along with the (information) data to help the receiver's equalizers to converge. This decreases the amount of information that can be transmitted in a specific amount of time.

Therefore, it is desired to provide a transceiver system with low cost and low complexity receivers that have reduced signal degradation.

SUMMARY OF THE INVENTION

The invention provides a radio transceiver system that reduces signal degradation without unduly increasing complexity and cost of the receiver. The transceiver system according to the invention is based on adaptive channel pre-coding. In the present transceiver system, a transmitter applies dynamically adapted pre-coding to the input data, prior to transmission. The adaptation of the pre-coding is based on feedback received from the receiver.

The feedback allows the transmitter to determine the average tap energy of the receiver's equalizers, and the peak-to-average ratio. This results in reliable operation over time-varying channel conditions, making the invention suitable for wireless and wireline systems with large interference. Furthermore, the adaptive pre-coding transceiver system according to the invention reduces the complexity of the receiver. The present transceiver system is capable of delivering multimedia voice, data, and video with high fidelity.

The transceiver system uses an adaptive Tomlinson-Harashima (TH) pre-coder and a modulo-type Viterbi decoder. The transceiver combines spatial diversity with adaptive modulation. These features result in the following advantages.

Error propagation problems, as would be experienced by conventional decision feedback equalizers (DFE), are minimized, and ISI are compensated. Equalization gain and full coding gain of trellis code are achieved. The system complexity of the receiver is significantly reduced. Spatial diversity is achieved by using transmission diversity and an adaptive antenna system, which improve throughputs and multipath interference rejection. Adaptive modulation increases spectral efficiency and service coverage by allowing different levels of services to users.

More particularly, the invention provides a method and apparatus for adaptively pre-coding signals transmitted in a communications network. A digital transceiver system includes a downlink channel and an uplink channel. In the system, a transmitter transmits signals on the downlink channel and receives signals on the uplink channel.

The transmitter includes a pre-coder having a plurality of filters. Each filter has a corresponding filter coefficient. The transmitter also includes a filter coefficient updater coupled to the pre-coder. A receiver of the system receives signals on the downlink channel and transmits signals on the uplink channel. The receiver includes linear equalizers having a plurality of taps. Each tap has a corresponding tap coefficient. The coefficient updater is configured to dynamically update the filter coefficients of the pre-coder according to the tap coefficients which are indicative of the frequency response of the receiver.

DETAILED DESCRIPTION OF THE PREFERRED EMBODIMENT

We provide a digital transceiver system that reduces signal degradation in a communications network. The network can be wireless or wireline. In the transceiver system, a transmitter dynamically and adaptively pre-codes a signal transmitted on a downlink channel. The adaptation is based on distortions detected in a signal acquired via an uplink channel from a receiver of the system.

Our invention enables a simpler implementation of decision feedback equalizers typically used in receivers. The pre-coding is dynamically adapted to channel variations by means of analyzing the receiver's equalizer's energy level and flatness of the frequency response of the channel.

System Description

Figure 1:
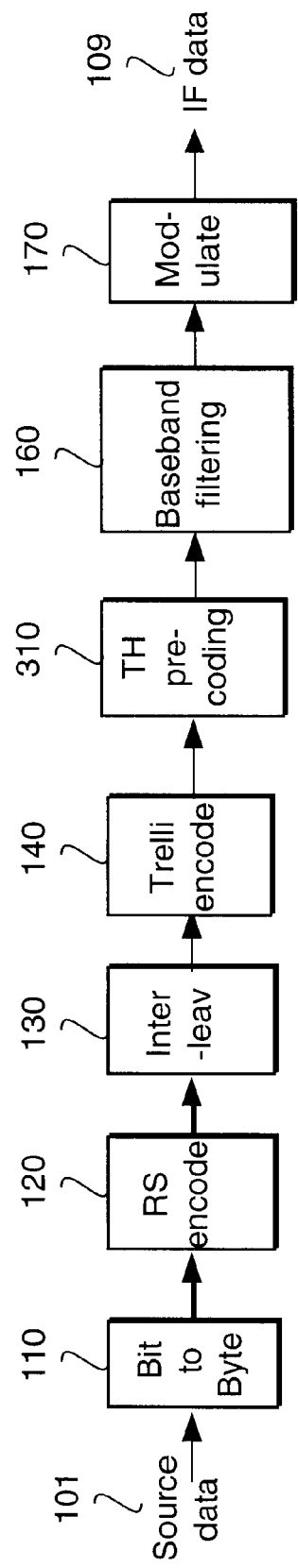
FIG. 1 is a block diagram of a transceiver system according to the invention.

FIG. 1 shows the major coding steps of a transmitter according to the invention. Source data bits 101 are converted 110 to bytes. The bytes are Reed-Solomon (RS) encoded 120 for forward error correction (FEC). The encoded signal is interleaved 130, using turbo coding, and trellis encoded 140 to map the signal to QPSK, 16 and 32 QAM constellations. After that, the coded signal is adaptively pre-coded 310 using Tomlinson Harashima (TH) pre-coding to transpose equalization functions from the receiver to the transmitter. The pre-coding according to the invention is described in greater detail below.

Following the pre-coding, the signal is bandpass-filtered 160, before modulated 170 to an IF carrier 109. The IF signal is determined by a selection of a specific modulation type.

Figure 3:
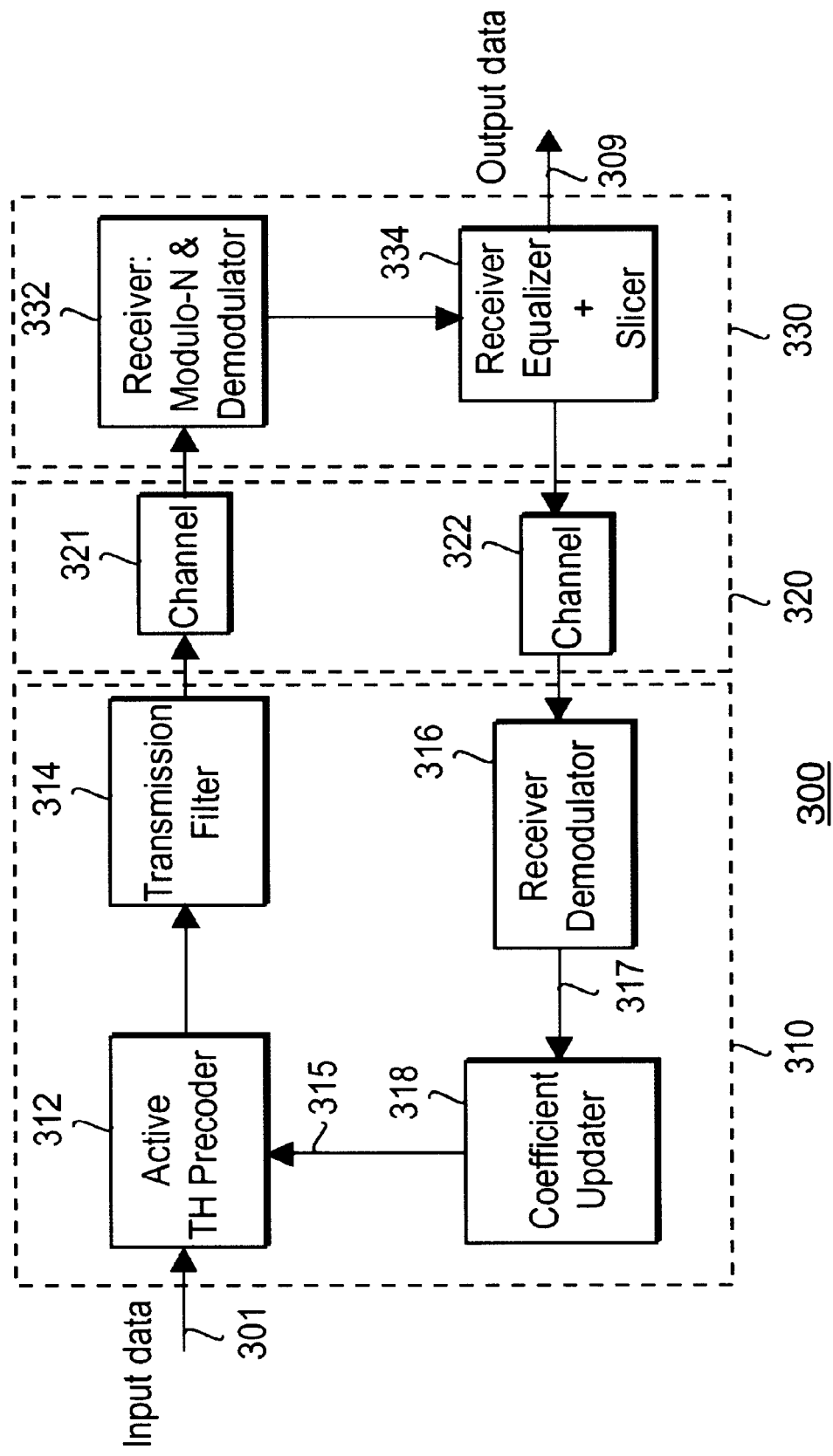
FIG. 3 is a block diagram of selected components of the transceiver of FIG. 1.

The receiver, see FIG. 3, reverses these operations. The input is first demodulated, then modulo-type Viterbi decoded (MVD), which combines a modulo operation and a conventional Viterbi decoder (VD). The MVD, in conjunction with TH pre-coder, reduces the system complexity significantly when compared to a conventional VD.

Conventional TH-Pre-Coding

Figure 2A:
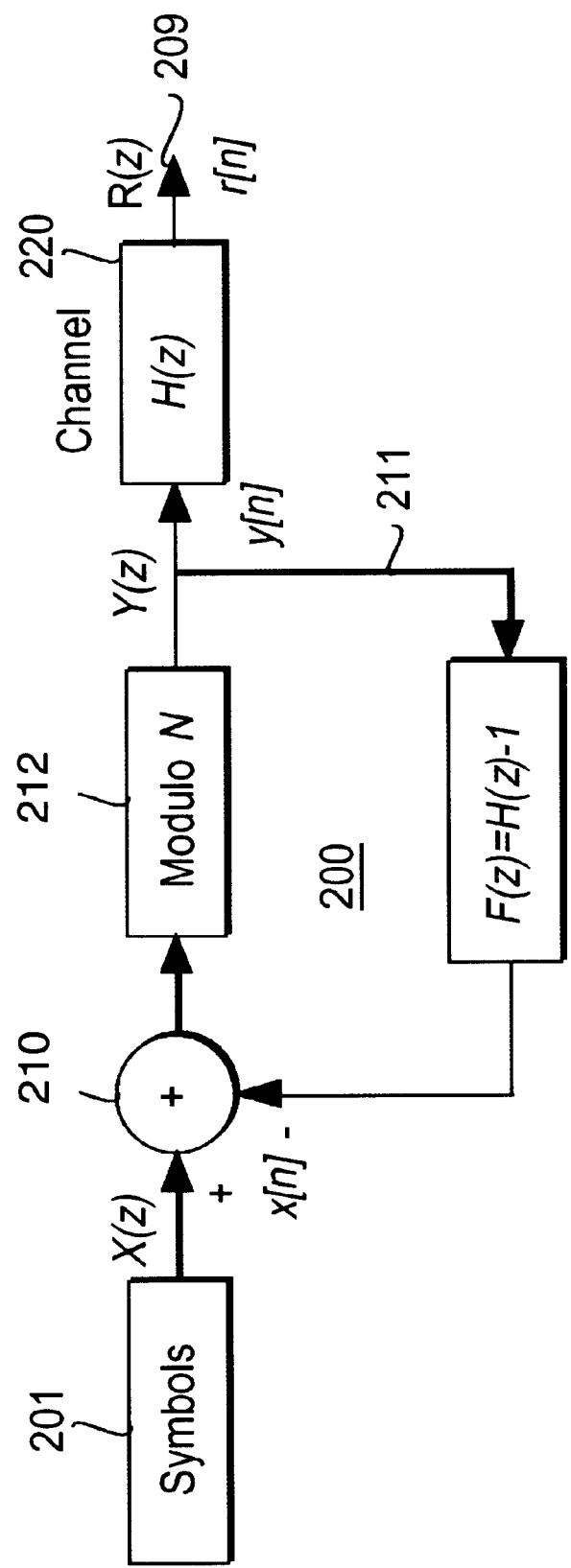
FIG. 2a is a block diagram of a conventional TH-pre-coder.

FIG. 2a shows the structure of a conventional TH-pre-coder 200, see Tomlinson, "*New Automatic Equalizer Employing Modulo Arithmetic*," Electronics Let., Vol. 7, March, 1971, also see U.S. Pat. No. 4,860,317 to Tomlinson, incorporated by reference herein. In a TH-pre-coder, a modulo-N adder 210 is followed by delay lines 211 coupled in series. The output of the delay lines are fed-back to the adder via multipliers having weighting coefficients F(z). This type of arrangement is known as an inverse filter.

For the sake of simplicity, only baseband operations are described here. Symbols 201 are equalized or pre-coded at the transmitter 100 using a modulo-N arithmetic adder 210, instead of a conventional adder, for a channel with z-transform H(z) effects. The parameter N is chosen large enough to accommodate the modulated symbols to be transmitted, and equalization is accomplished as follows.

The output 212 of the modulo-N adder is:

$$Y(z)=(X(z)-Y(z)[H(z)-1]) \bmod (N), \quad (1)$$

where Y(z) always has a magnitude in the range −N to +N.

In the time domain, the corresponding y[n] can be written as:

$$y[n]=x[n]-y[n]*(h[n]-\beta[n])-k[n]N, \quad (2)$$

where k[n] is a time-varying integer reflecting the modular operation. So, the channel output 209 is:

$$r[n]=y[n]*h[n]=y[n]*[\beta[n]+h[n]-\beta[n]]=y[n]+y[n](h[n]-\beta[n])=x[n]-k[n]N. \quad (3)$$

The input x[n] can be recovered by passing r[n] through a modulo-N operation at the receiver.

Figure 2B:
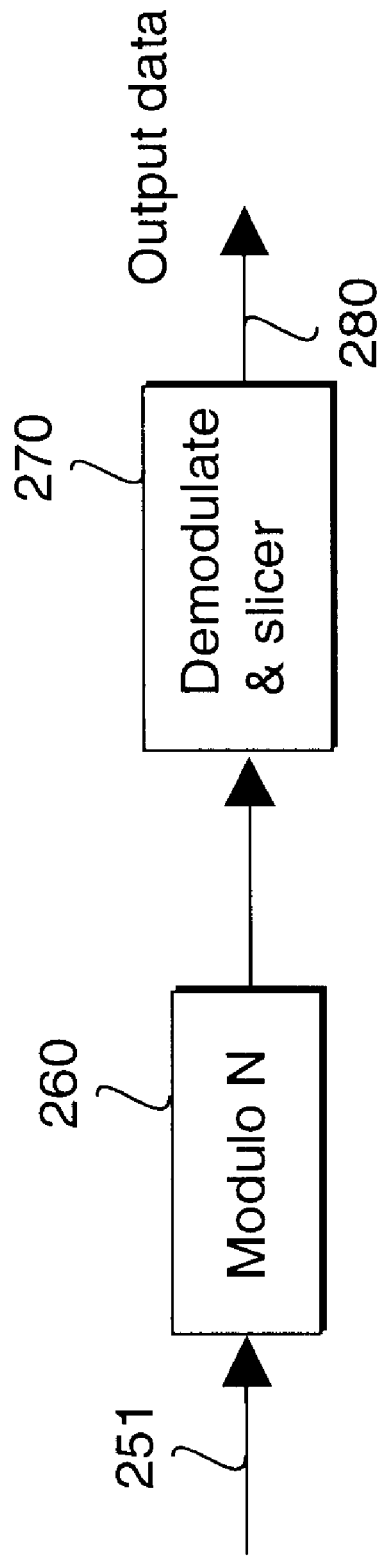
FIG. 2b is a block diagram of a demodulator/slicer of a receiver of the transceiver system of FIG. 1.

The corresponding components of the receiver are shown in FIG. 2b. The received signal 251 is passed through a similar modulo-N operation 260, and then demodulated and compared against a slicer device 270 to determine its value, i.e., output data 280.

The implementation of a conventional TH-pre-coder 200 is straightforward. However, the above TH-pre-coding scheme is generally suitable for channel characteristics that are time-invariant. In reality, this is not realistic, especially for wireless link. Most of the time, particularly in a highly mobile environment, the channel characteristics are anything but invariant.

Therefore, it becomes necessary to estimate the channel characteristics over time. In practice, the channel characteristics could be estimated on a duplex communication link. This could be done in two ways.

In a first method, the receiver would send back its estimate of the channel parameters to the transmitter during normal operation. Any sudden change in the channel parameters could be corrected either by adjusting the coefficients F(z) accordingly, or by switching the system to transmit a training sequence until the correct link is reestablished.

In a second method, a training sequence is periodically sent from the receiver, via the uplink, to the transmitter. This training sequence could be used by the pre-coder 312 to estimate the channel parameters.

It is possible to use a downlink receiver similar to FIG. 2b, and send a training sequence back to the transmitter to adjust the pre-coder's coefficients F(z). However, this is insufficient for wideband channels with frequency dependent fading.

Hence, we have invented the following adaptive channel pre-coding system.

Adaptive TH Pre-coding

System Structure

FIG. 3 shows an adaptive channel pre-coding transceiver system according to our invention. The system 300 includes a transmitter (base station) 310, a duplex asymmetrical communication channel 320, and a receiver (client radio) 330. In the following description, we focus only on the components that are substantially different from what is known in the prior art.

Accordingly, the transmitter 310 includes an adaptive TH pre-coder 312, transmission filters 314, a receiver demodulator 316, and a coefficient updater (CU) 318. The TH-pre-coder 312 includes a number of multipliers, each having a corresponding weighting coefficient F(z).

As stated above, the channel 320 includes a large downlink 321 from the "transmitter" 310 to many "receivers" 330, and a smaller uplink 322 from an individual "receiver" to the "transmitter" 310.

The receiver 330 includes a demodulator 332 coupled to an equalizer/slicer 334. As an advantage, our equalizers in the receiver 330 can simply be linear, unlike the complex decision feedback equalizers used in the prior art.

System Operation

During operation of the system 300, the pre-coder 312 and filter 314, from input data 301, generate a signal transmitted over the downlink 321. The transmitted signal is received and demodulated in the receiver to produce output data 309. The "receiver" 330 transmits data over the uplink back to the "transmitter" 310. The receiver's data are demodulated. Some of the data are used to update coefficients F(z) of the TH pre-coder 312, as described in greater detail below.

Specifically, weighting coefficients F(z) of our TH pre-coder 312 are periodically updated according to the tap coefficients $C_i$ of the receiver's equalizers 334. Upon receiving the tap coefficients 317, the CU determines the total energy E of the downlink receiver's equalizers by summing the squared values of the tap coefficients $C_i$:

$$E(t) = [C_1(t)^2 + C_2(t)^2 + \ldots + C_n(t)^2]/n, \quad (4)$$

where n is the total number of taps $C_i$. Notice that E(t) is a function of time. A dip in the frequency response, due to fading or multipath effect, will cause the equalizers' coefficients of those taps corresponding to the dip position to deviate from E(t), as the equalizers try to compensate. This deviation is measured by $$D_i(t) = [C_i - E_c]/E(t), \quad (5)$$

where $E_c$ is a calibrated tap coefficient determined using training sequences, see below, and $D_i$ is the overall deviation. We use $D_i(t)$ to adjust the TH pre-coder filter F(z) coefficients.

The new dynamically adapted F(z) is:

$$F(z) = [D_1 * h(1) * z^{-1} + D_2 * h(2) * z^{-2} + \ldots + D_n * h(n) * z^{-n}]. \quad (6)$$

Figure 4:
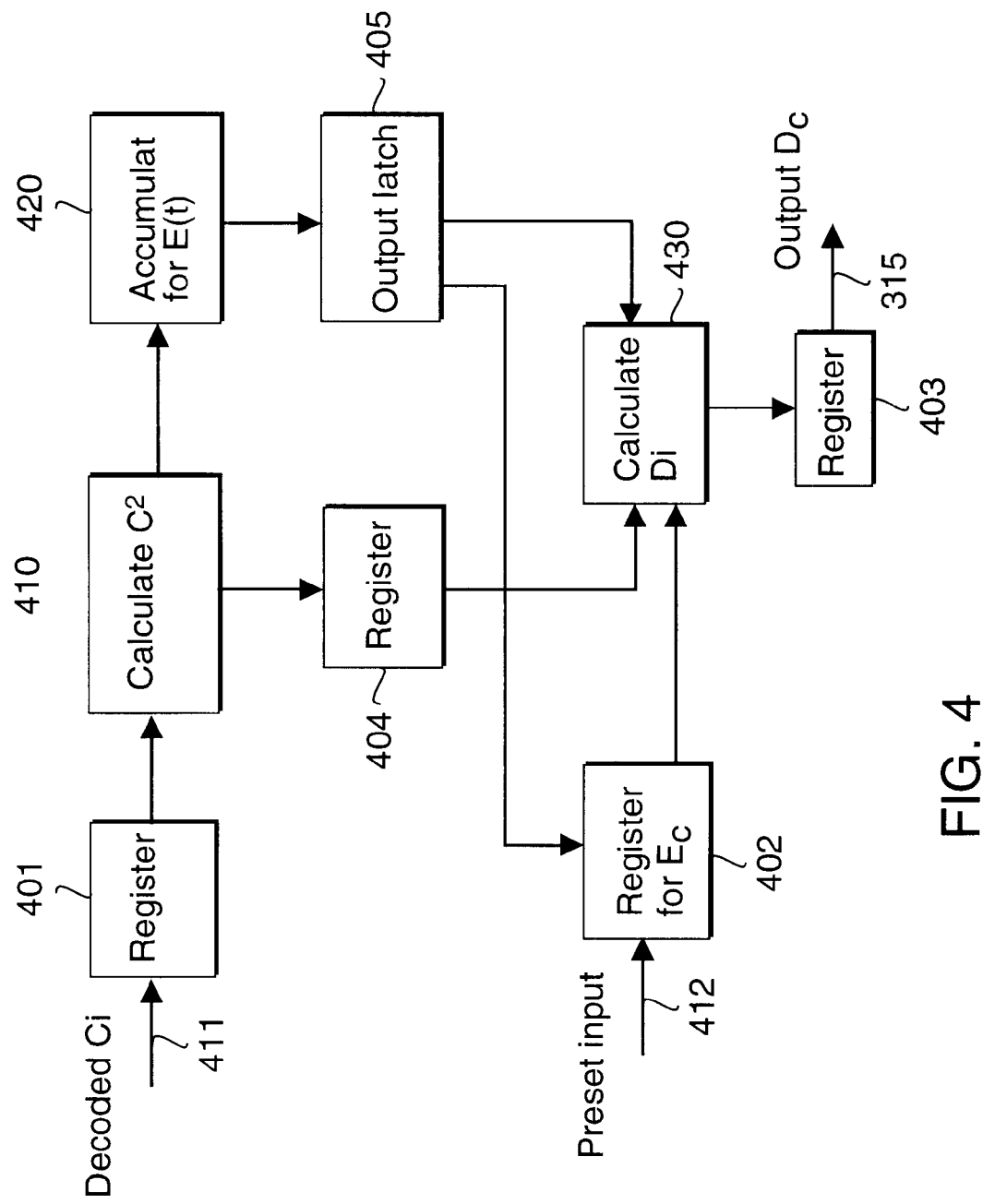
FIG. 4 is a block diagram of a circuit for updating coefficients of an active pre-coder of FIG. 3.

FIG. 4 shows a circuit for updating the weighting coefficients F(z) of our adaptive TH pre-coder 312. The circuit includes two input registers 401–402, one output register 403, and an internal register 404 and latch 405 for synchronizing the data. Block 410 determines the "squared" coefficients $^2_i$ from the decoded tap weights $C_i$ provided as input 411. The weights are accumulated in block 420 according to equation (4) above. A preset calibrated coefficient $E_c$ 412 is provided on line 412, and combined with the sum out of block 420 to determine $D_i$ in block 430. The output is simply forwarded to the precoder 312 on line 315 of FIG. 3 as a "gain" factor of the weighting coefficients F(z).

Training Sequence

Figure 5:
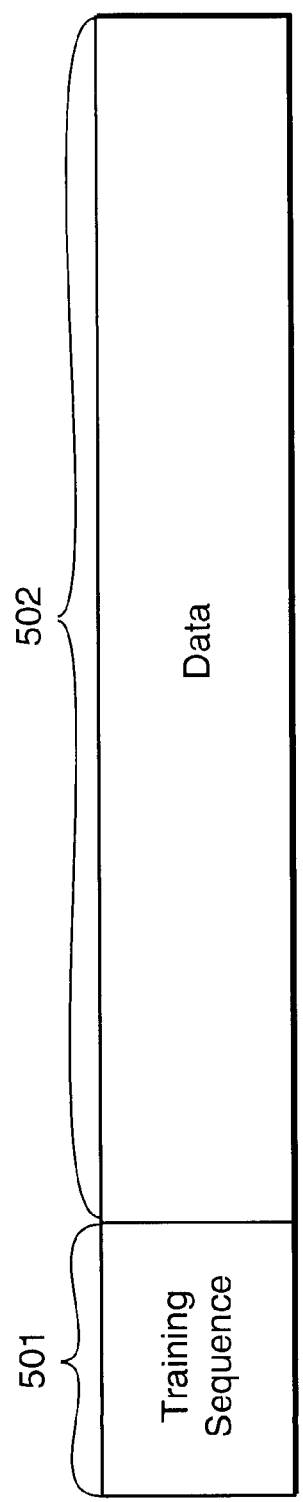
FIG. 5 is a block diagram of a training sequence used by the transceiver system of FIG. 1.

As shown in FIG. 5, we can also add a training sequence 501 to data 502 transmitted on either the downlink or uplink channel to further minimize signal degradation. The training sequence can help the receiver's equalizers to establish initial convergence. The training sequence can also be used by the CU to calculate a set of reference values for Ec and $D_i$.

The training sequence is a pre-defined pseudo random (PN) sequence generated using a polynomial. The sequence is known to the transmitter and the receiver. During channel acquisition, the receiver's equalizers use a locally stored version of the PN training sequence to compare with a received training sequence, and the difference of the two is used to update the adaptive equalizers' coefficients. As the equalizers converge over the training period, the decision error will gradually be reduced. This ensures small decision errors on information data 402 which follow the training sequence.

Multiple Antenna Elements

Our adaptive pre-coding can be combined with a transmitter having multiple variable rate QAM antenna elements. There, the data are transmitted via different antennas. A particular antenna is selected so that channel distortions, or overall tap deviations $D_i$, is minimized.

Although we describe our invention using a fixed wireless system as an example, it should be understood that our system can also be used with wireline systems such as a home phone network, such as ADSL, VDSL, and xDSL. Our system will work with multi-level QAM and PSK modulation formats, and their variations, such as 16 QAM, 64 QAM, 256 QAM, QPSK, and 8 PSK.

System Model

A model of the transceiver system according to our invention has the following performance characteristics. In the model, a DOCSIS-compliant FEC system with outer Reed-Solomon (RS) code concatenated with inner Trellis code is used. The RS coding rate is fixed at (204,188), whereas the inner coding rate is variable, depending on bandwidth and data rates. For QPSK mode, supported rates are 1/2, 2/3, 3/4, 5/6, 7/8, with an inner code constraint length of 7. Transmit diversity is applied only at the base station. In most practical systems, downlink data rates are much higher than uplink data rates, and slow fading is dominant. For both downlink and uplink transmissions, time division multiple access (TDMA) scheme with time division duplex (TDD) is assumed.

The bit error rate (BER) performance of our system is examined using typical propagation models in additive white Gaussian noise (AWGN) channels. A two-antenna transmit diversity system is used. Improvements in effective service coverage, and increase in throughputs for fixed service coverage is measured. To analyze the performance of the system under different propagation environments, two carrier frequencies, 2 GHz and 26 GHz are examined. Maximum distance for each set of modulation and FEC rate is calculated assuming isotropic radiated power. Data rates of 12, 24, and 36 Mb/s are used. The model is based on spatial diversity for base-station sides only. Additional gains can be achieved by also applying spatial diversity to uplink from mobile terminals.

Model Performance and Effect

Compared to the traditional TH pre-coder 200 with fixed channel response, the adaptive pre-coding system with two antenna elements, as modeled above, provides up to 6 dB improvements in the signal-to-noise ratio at BER of $10^{-6}$.

Compared to traditional transceiver systems, which use decision feedback equalizers at the downlink receiver, our system, which uses simple linear equalizers, reduces the complexity of the receiver by at least 70%. Our system also has the advantage of faster response and does not suffer the noise enhancement of prior art linear equalizers because we adaptively pre-code at the transmitter.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A digital communication system including a downlink channel and an uplink channel communications network, comprising:

a transmitter configured to transmit a first signal on the downlink channel and to receive a second signal on the uplink channel, the transmitter including a pre-coder having a plurality of delay lines and multipliers with corresponding weighting coefficients F(z), and a coefficient updater is coupled to the pre-coder to update the weighting coefficients F(z); and a receiver configured to receive the first signal on the downlink channel and to transmit the second signal on the uplink channel, the receiver including linear equalizers having a plurality of taps, each tap having a corresponding tap coefficient $C_i$, the coefficient updater configured to dynamically update the weighting coefficients F(z) according to the tap coefficients $C_i$; and wherein the coefficient updater determines a total energy E of the equalizers by summing the squared values of the tap coefficients $C_i$:

$E(t)=[C_1(t)^2+C_2(t)^2+\ldots+C_n(t)^2]/n$, where n is the total number of taps, and t is time.

2. The digital communication system of claim 1 wherein the receiver periodically transmits the tap coefficients $C_i$ to the transmitter.

3. The digital communication system of claim 1 wherein the coefficient updater determines a deviation $D_i$ in the total energy, measured by:

$$D_i(t)=[C_i-E_c]/E(t),$$

where $E_c$ is a calibrated tap coefficient determined using a training sequence.

4. The digital communication system of claim 3 wherein the updated weighting coefficients F(z) are:

$$F(z)=[D_1*h(1)*z^{-1}+D_2*h(2)*z^{-2}+\ldots+D_n*h(n)*z^{-n}],$$

where h(n) are the weighting coefficients before updating.

5. The digital communication system of claim 1 wherein a training sequence is sent periodically by the transmitter to the receiver to establish weighting and tap coefficients.

6. The digital communication system of claim 5 wherein the training sequence is a pre-defined pseudo random (PN) sequence generated using a polynomial.

7. The digital communication system of claim 5 wherein the training sequence is sent periodically by the transmitter to the receiver to update the weighting and tap coefficients periodically.

8. The digital communication system of claim 3 wherein the transmitter further comprises:

a plurality of variable rate antenna elements, and means for selecting a particular antenna to minimize the deviation $D_i$.

9. The digital communication system of claim 1 wherein the communications network is asymmetric and wireless.

10. A method for communicating signals in a communications network including a downlink channel and an uplink channel, comprising:

pre-coding an input signal using a plurality of delay lines and multipliers, each multiplier having a corresponding weighting coefficient, transmitting the pre-coded signal on the downlink channel;

receiving the transmitted signal using a plurality of linear equalizers having a plurality of taps, each tap having a corresponding tap coefficient; and updating dynamically the weighting coefficients according to the tap coefficients, wherein the updating determines a total energy E of the equalizers by summing the squared values of the tap coefficients $C_i$:

$E(t)=[C_1(t)^2+C_2(t)^2+\ldots+C_n(t)^2]/n$, where n is the total number of taps, and t is time.

* * * * *